(12) United States Patent
Miyairi et al.

(10) Patent No.: US 12,523,167 B2
(45) Date of Patent: Jan. 13, 2026

(54) HONEYCOMB STRUCTURE, EXHAUST GAS PURIFYING DEVICE AND METHOD FOR PRODUCING HONEYCOMB STRUCTURE

(71) Applicant: NGK INSULATORS, LTD., Nagoya (JP)

(72) Inventors: Yukio Miyairi, Nagoya (JP); Masaaki Masuda, Nagoya (JP); Kyohei Kato, Nagoya (JP); Takafumi Kimata, Nagoya (JP); Kazuya Hosoda, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 82 days.

(21) Appl. No.: 17/304,889

(22) Filed: Jun. 28, 2021

(65) Prior Publication Data

US 2021/0324772 A1    Oct. 21, 2021

Related U.S. Application Data

(63) Continuation of application No. PCT/JP2020/000934, filed on Jan. 14, 2020.

(30) Foreign Application Priority Data

Mar. 15, 2019   (JP) ................................ 2019-049069

(51) Int. Cl.
*F01N 3/027*     (2006.01)
*B01D 46/24*     (2006.01)
*F01N 3/022*     (2006.01)

(52) U.S. Cl.
CPC ....... *F01N 3/0222* (2013.01); *B01D 46/2429* (2013.01); *B01D 46/24494* (2021.08);
(Continued)

(58) Field of Classification Search
None
See application file for complete search history.

(56) References Cited

U.S. PATENT DOCUMENTS

| 4,456,457 A | 6/1984 | Nozawa et al. |
| 4,523,935 A | 6/1985 | Takagi et al. |

(Continued)

FOREIGN PATENT DOCUMENTS

| JP | S57-179317 A1 | 11/1982 |
| JP | S58-023187 A1 | 2/1983 |

(Continued)

OTHER PUBLICATIONS

Tsuneyoshi et al., machine translation JP 2012-072041, Apr. 12, 2012 (Year: 2012).*

(Continued)

*Primary Examiner* — Mary I Omori
(74) *Attorney, Agent, or Firm* — BURR PATENT LAW, PLLC

(57) ABSTRACT

A pillar shaped honeycomb structure, including: an outer peripheral wall; and porous partition walls disposed inside the outer peripheral wall, the partition walls defining a plurality of cells, each of the cells penetrating from one end face to other end face to form a flow path, wherein one or both of the one end face and the other end face includes a groove portion; and wherein at least one annular conductive loop containing a conductive material is embedded in the groove portion.

11 Claims, 12 Drawing Sheets

(52) U.S. Cl.
CPC ...... *F01N 2330/02* (2013.01); *F01N 2330/06* (2013.01); *F01N 2330/12* (2013.01)

(56) References Cited

U.S. PATENT DOCUMENTS

| | | | |
|---|---|---|---|
| 5,277,937 A | | 1/1994 | Bagley et al. |
| 5,292,485 A | * | 3/1994 | Harada .............. B01D 39/2093 60/303 |
| 5,393,499 A | * | 2/1995 | Bagley .................. H05B 3/141 422/177 |
| 5,569,455 A | | 10/1996 | Fukui et al. |
| 6,166,358 A | * | 12/2000 | Abe .................. B01D 53/9454 219/553 |
| 2008/0229931 A1 | * | 9/2008 | Katsuyama ........ B01D 46/2418 428/116 |
| 2009/0252919 A1 | * | 10/2009 | Ogura ................ B01D 46/2451 428/116 |
| 2013/0283887 A1 | * | 10/2013 | Ante ....................... F01N 9/002 73/28.01 |
| 2017/0014763 A1 | | 1/2017 | Crawford et al. |
| 2017/0022868 A1 | | 1/2017 | Crawford et al. |

FOREIGN PATENT DOCUMENTS

| | | |
|---|---|---|
| JP | S61-084118 U | 6/1986 |
| JP | S64-069711 A1 | 3/1989 |
| JP | H06-212954 A1 | 8/1994 |
| JP | H06-327937 A1 | 11/1994 |
| JP | 2010-013945 A | 1/2010 |
| JP | 2012072041 A * | 4/2012 |
| WO | 2016/021186 A1 | 2/2016 |

OTHER PUBLICATIONS

English translation of the International Preliminary Report on Patentability (Chapter I) dated Sep. 30, 2021 (Application No. PCT/JP2020/000934).

Japanese Office Action (Application No. 2021-506194) dated Feb. 22, 2022 (with English translation).

International Search Report and Written Opinion (Application No. PCT/JP2020/000934) dated Mar. 24, 2020.

* cited by examiner

HONEYCOMB STRUCTURE, EXHAUST GAS PURIFYING DEVICE AND METHOD FOR PRODUCING HONEYCOMB STRUCTURE

FIELD OF THE INVENTION

The present invention relates to a honeycomb structure, an exhaust gas purifying device, and a method for producing the honeycomb structure. More particularly, the present invention relates to a honeycomb structure, an exhaust gas purifying device, and a method for producing the honeycomb structure, which are capable of sufficient electromagnetic induction heating even at a relatively low frequency of several tens of kHz or less, have no limitation in relation to a Curie point of a material, and have a good heating rate.

BACKGROUND OF THE INVENTION

There is an increased need for reduction of harmful components (HC, NOx, CO) in automobile exhaust gas. At present, the harmful components to be discharged are discharged during a period immediately after starting an engine, i.e., a period during which a catalyst temperature is lower and an activity of the catalyst is insufficient. To address this problem, Patent Literature 1 discloses a technique for inserting a magnetic wire into a part of cells of a cordierite honeycomb which is widely used as a catalyst supported honeycomb, and passing an electric current through a coil on an outer circumference of the honeycomb to cause induction heating, thereby increasing a temperature of the wire. According to this technique, a temperature of the honeycomb can be increased by the induction heating, and the catalyst can be supported on the honeycomb itself to maintain the catalytic activity, or a gas flowing through the heated honeycomb can be heated to heat the catalyst honeycomb located downstream.

Exhaust carbon fine particles from diesel engines and gasoline engines are affected on human health, so that there is also an increased need for reduction of those fine particles. To address them, wall-flow type filters of honeycomb structures alternately plugged are used. Soot collected by the filters are burned out and removed by increasing a temperature of the exhaust gas. However, if a time required for this is longer, there causes a problem that consumption of a fuel required for increasing the temperature of the exhaust gas increases. Further, it is preferable to mount the filter at an underfloor position having a relatively large space from the viewpoint of ensuring a mounting space, in terms of ensuring a degree of freedom in a design for forming an exhaust system. However, if it is placed at the underfloor position, a temperature of an exhaust gas from an engine is decreased, which causes a problem that the carbon fine particles (soot) cannot be burn out and removed. To address this problem, Patent Literature 2 discloses a technique for dispersedly arranging magnetic fine particles on surfaces of partition walls of a filter and heating them by electromagnetic induction heating. Further, Patent Literature 3 discloses a technique for inserting a magnetic wire into plugged portions of a filter.

CITATION LIST

Patent Literatures

[Patent Literature 1] U.S. Patent Application Publication No. 2017/0022868 A1
[Patent Literature 2] WO 2016/021186 A1
[Patent Literature 3] U.S. Patent Application Publication No. 2017/0014763 A1

SUMMARY OF THE INVENTION

However, the method of mounting the wire and the method of dispersing and arranging the metal particles have problems that the diameter of the wire and the diameters of the metal particles are too small, and eddy currents are difficult to be generated at a low frequency, so that the heating rate cannot be sufficient. If eddy currents are easily generated and magnetic hysteresis is also used, the wire can also be heated. However, it requires the use of a ferromagnet material, and causes problems that it cannot be heated at a temperature above a Curie point, and costs are increased in high frequency power supply systems.

In view of those circumstances, an object of the present invention is to provide a honeycomb structure, an exhaust gas purifying device, and a method for producing the honeycomb structure, which are capable of sufficient electromagnetic induction heating even at a relatively low frequency of several tens of kHz or less, have no limitation in relation to a Curie point of a material, and have a good heating rate.

As a result of intensive studies, the present inventors have found that the above problems can be solved by providing a groove portion on one or both of one end face and other end face of the honeycomb structure, and embedding at least one annular conductive loop containing a conductive material in the groove portion. That is, the present invention is specified as follows:

(1) A pillar shaped honeycomb structure, comprising:
   an outer peripheral wall; and
   a porous partition wall disposed inside the outer peripheral wall, the partition walls defining a plurality of cells, each of the cells penetrating from one end face to other end face to form a flow path,
   wherein one or both of the one end face and the other end face comprises a groove portion; and
   wherein at least one annular conductive loop comprising a conductive material is embedded in the groove portion.

(2) An exhaust gas purifying device, comprising:
   the honeycomb structure according to (1);
   a coil wiring that spirally surrounds an outer circumference of the honeycomb structure; and
   a metal pipe for housing the honeycomb structure and the coil wiring.

(3) A method for producing a pillar shaped honeycomb structure, the honeycomb structure comprising:
   an outer peripheral wall; and
   a porous partition wall disposed inside the outer peripheral wall, the partition walls defining a plurality of cells, each of the cells penetrating from one end face to other end face to form a flow path,
   wherein the method comprises the steps of:
   forming a groove portion on one or both of the one end face and the other end face; and
   embedding at least one annular conductive loop comprising a conductive material in the groove portion.

According to the present invention, it is possible to provide a honeycomb structure, an exhaust gas purifying device, and a method for producing the honeycomb structure, which are capable of sufficient electromagnetic induction heating even at a relatively low frequency of several tens of kHz or less, have no limitation in relation to a Curie point of a material, and have a good heating rate.

DETAILED DESCRIPTION OF THE INVENTION

Figure 1:
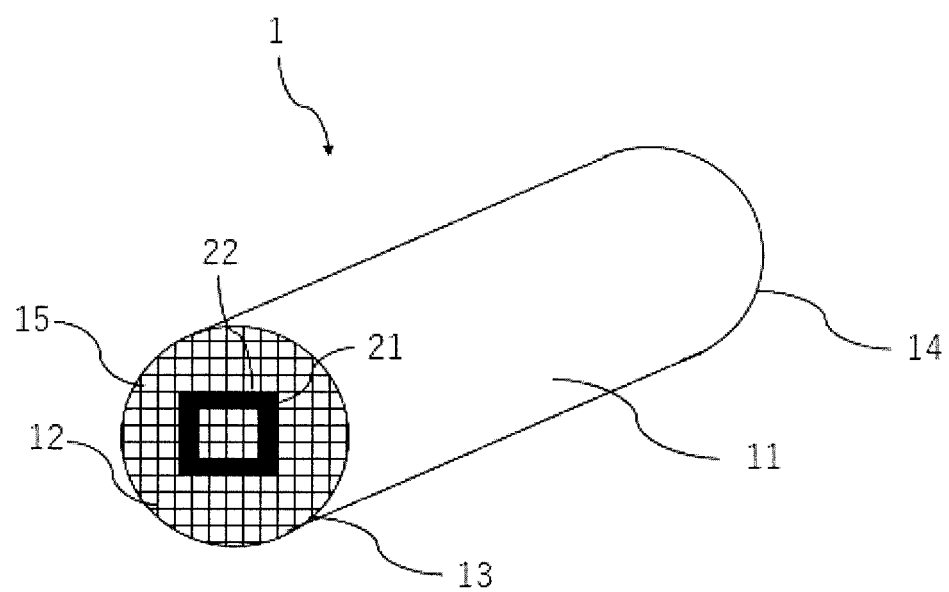
FIG. 1 is a perspective view schematically showing a honeycomb structure according to an embodiment of the present invention.

Hereinafter, embodiments of a honeycomb structure according to the present invention will be described with reference to the drawing. However, the present invention is not limited to these embodiments, and various changes, modifications, and improvements may be made based on knowledge of those skilled in the art, without departing from the scope of the present invention.

<1. Honeycomb Structure>

Figure 2A:
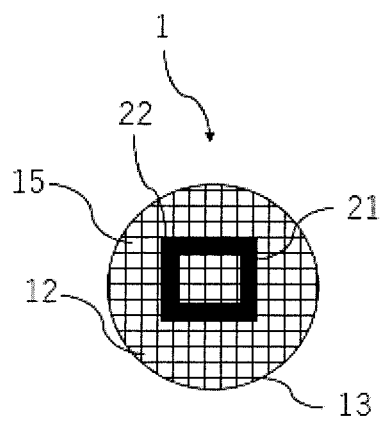
FIG. 2(a) is a plane view schematically showing one end face of a honeycomb structure according to an embodiment of the present invention.
Figure 2B:
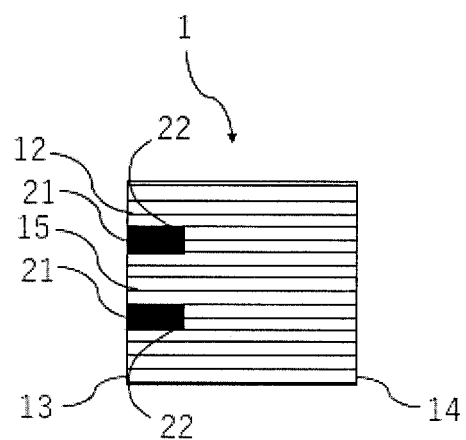
FIG. 2(b) is a cross-sectional view schematically showing a cross section of cells and partition walls of a honeycomb structure according to an embodiment of the present invention, the cross section being parallel to an extending direction of the cells.

FIG. 1 is a perspective view schematically showing a honeycomb structure 1 according to an embodiment of the present invention. FIG. 2(a) is a plane view schematically showing one end face 13 of the honeycomb structure 1. FIG. 2(b) is a cross-sectional view schematically showing a cross section of cells 15 and partition walls 12 of the honeycomb structure 1, the cross section being parallel to an extending direction of the cells 15. The illustrated honeycomb structure 1 is cylindrical and has an outer peripheral wall 11 located on the outermost circumference. Further, the illustrated honeycomb structure 1 has the porous partition walls 12 which are arranged inside the outer peripheral wall 11 and define a plurality of cells 15 that penetrate from one end face 13 to the other end face 14 to form flow paths.

Although materials of the partition walls 12 and the outer peripheral wall 11 of the honeycomb structure 1 are not particularly limited, a porous body having a large number of pores are required. Therefore, the partition walls 12 and the outer peripheral wall 11 are generally made of a ceramic material. The ceramic material may contain at least one selected from the group consisting of $SiO_2$, $Al_2O_3$, and MgO. Examples of the ceramic material include a sintered body of ceramics comprised of cordierite ($2MgO \cdot 2Al_2O_3 \cdot 5SiO_2$), silicon carbide, aluminum titanate, silicon nitride, mullite, alumina, a silicon-silicon carbide-based composite material, or silicon carbide-cordierite based composite material, in particular, a sintered body mainly based on a silicon-silicon carbide composite material or silicon carbide. As used herein, the expression "silicon carbide-based" means that the honeycomb structure 1 contains silicon carbide in an amount of 50% by mass or more of the entire honeycomb structure 1. The phrase "the honeycomb structure 1 is mainly based on a silicon-silicon carbide composite material" means that the honeycomb structure 1 contains 90% by mass or more of the silicon-silicon carbide composite material (total mass) based on the entire honeycomb structure 1. Here, for the silicon-silicon carbide composite material, it contains silicon carbide particles as an aggregate and silicon as a binding material for binding the silicon carbide particles, and a plurality of silicon carbide particles are preferably bonded by silicon so as to form pores between the silicon carbide particles. The phrase "the honeycomb structure 1 is mainly based on silicon carbide" means that the honeycomb structure 1 contains 90% by mass or more of silicon carbide (total mass) based on the entire honeycomb structure 1.

The cell shape of the honeycomb structure 1 may be, but not particularly limited to, a polygonal shape such as a triangle, a quadrangle, a pentagon, a hexagon and an octagon; a circular shape; or an ellipse shape, in a cross section orthogonal to the central axis. Alternatively, the cell shape may be other infinite shapes.

Further, an outer shape of the honeycomb structure 1 may be, but not particularly limited to, a shape such as a pillar shape with circular end faces (circular pillar shape), a pillar shape with oval end faces, and a pillar shape with polygonal (square, pentagonal, hexagonal, heptagonal, octagonal, and the like) end faces, and the like. Furthermore, the size of the honeycomb structure 1 is not particularly limited, and an axial length of the honeycomb structure 1 is preferably from 40 to 500 mm. Further, for example, when the outer shape of the honeycomb structure 1 is cylindrical, a radius of each end face is preferably from 50 to 500 mm.

Each partition wall of the honeycomb structure 1 preferably has a thickness of from 0.10 to 0.50 mm, and more preferably from 0.25 to 0.45 mm, in terms of ease of production. For example, the thickness of 0.20 mm or more improves the strength of the honeycomb structure 1. The thickness of 0.50 mm or less can result in lower pressure loss when the honeycomb structure 1 is used as a filter. It should be noted that the thickness of the partition walls 12 is an average value measured by a method for observing the axial cross section of the honeycomb structure 1 with a microscope.

Further, the partition walls 12 forming the honeycomb structure 1 preferably have a porosity of from 30 to 70%, and more preferably from 40 to 65%, in terms of ease of production. The porosity of 30% or more tends to decrease a pressure loss. The porosity of 70% or less can maintain the strength of the honeycomb structure 1.

The porous partition walls 12 preferably have an average pore size of from 5 to 30 μm, and more preferably from 10 to 25 μm. The average pore size of 5 μm or more can further decrease the pressure loss when the honeycomb structure 1 is used as a filter. The average pore size of 30 μm or less can maintain the strength of the honeycomb structure 1. As used herein, the terms "average pore diameter" and "porosity" mean an average pore diameter and a porosity measured by mercury porosimetry, respectively.

The honeycomb structure 1 preferably has a cell density in a range of from 5 to 93 cells/cm$^2$, and more preferably in a range of from 5 to 63 cells/cm$^2$, and even more preferably in a range of from 31 to 54 cells/cm$^2$, although not particularly limited thereto.

The honeycomb structure 1 includes a groove portion 22 on one end surface 13, and at least one annular conductive loop 21 containing a conductive material is embedded in the groove portion 22. According to such a configuration, the shape of the conductive loop 21 is annular, so that it is easy for a current to flow so as to go around the conductive loop 21 by electromagnetic induction heating, and an eddy current tends to be generated. Therefore, electromagnetic induction heating can be sufficiently performed even at a relatively low frequency of several tens of kHz or less. Further, since the shape of the conductive loop 21 makes it easy to generate the eddy current, there is no limitation in relation to a Curie point of the material, such as the fact that a ferromagnetic material has to be used for the conductive loop 21, thereby enabling the honeycomb structure 1 having a good heating rate to be obtained.

The groove portion 22 and the conductive loop 21 are preferably provided on both one end face 13 and the other end face 14 of the honeycomb structure 1. According to such a configuration, eddy currents can be generated on both of the end faces 13, 14 of the honeycomb structure 1, so that electromagnetic induction heating of the honeycomb structure 1 can be more satisfactorily performed. In the present specification, a depth direction of the groove portion 22 provided on one end face 13 and/or the other end face 14 of the honeycomb structure 1 is parallel to the extending direction of the cells 15 of the honeycomb structure 1.

Specifically, the conductive loop 21 can be provided on the end face (13 or 14) which will be an inlet of an exhaust gas of the honeycomb structure 1, the end face (14 or 13) which will be an outlet, or both of the end faces. When the honeycomb structure 1 is used for combustion removal of carbon fine particles (soot) collected in the filter, it is convenient that the conductive loop 21 is arranged on the inlet end face side when heating is performed in a state where there is a gas flow, because the heat generated by the conductive loop 21 is easily transferred to the interior of the honeycomb structure 1. Further, in an application mainly assuming heating in a state where there is no gas flow, the conductive loop 21 is preferably embedded on the outlet end face side where an amount of soot accumulated is higher. When the conductive loop 21 is embedded only on the inlet end face side or only on the outlet end face side, the purpose can be achieved by arranging the outer peripheral coil only in a portion corresponding to that position, so that the size of the coil used for electromagnetic induction heating can be reduced.

The groove portion 22 is formed over a plurality of cells 15 of the honeycomb structure 1. As described above, the groove portion 22 is for embedding the conductive loop 21. Therefore, a depth of the groove portion 22 may be equal to or greater than a thickness of the conductive loop 21. Similarly, the groove portion 22 may be formed with a sufficient shape, number, size, and the like to embed the conductive loop 21, and may be formed according to the shape, number, size, and the like of the conductive loop 21.

The conductive loop 21 is embedded in the groove portion 22 provided on the end face 13 side of the honeycomb structure 1. The conductive loop 21 preferably has a thickness of from 0.1 to 5 mm. The thickness of the conductive loop 21 of 0.1 mm or more can allow a larger eddy current to be generated. The thickness of the conductive loop 21 of 5 mm or less can allow an area of a portion that inhibits the gas flow to be reduced, so that a pressure loss can be further reduced. The thickness of the conductive loop 21 is more preferably from 0.5 to 4 mm, and even more preferably from 1 to 3 mm.

The conductive loop 21 as shown in FIGS. 1 and 2 is formed in a substantially regular quadrangular annular shape with its center being the center of the end surface 13, as viewed from the end surface 13 side of the honeycomb structure 1. A size of the conductive loop 21 when viewed from the end face 13 side of the honeycomb structure 1 is not particularly limited, and depends on the size of the end face 13 of the honeycomb structure 1. For the annular conductive loop 21 having a substantially regular quadrangular shape as shown in FIGS. 1 and 2, the conductive loop 21 preferably has a width of from 0.1 to 5 mm. The width of the conductive loop 21 of 0.1 mm or more can allow a larger eddy current to be generated. The width of the conductive loop 21 of 5 mm or less can allow the pressure loss to be further reduced. The width of the conductive loop 21 may more preferably be from 0.5 to 4 mm, and even more preferably from 1 to 3 mm.

The conductive loop 21 is not limited to a quadrangular annular shape, and may be formed in a rectangular annular shape such as a circular shape, an elliptical shape, a triangular shape, and a pentagonal shape or other polygonal shapes.

Figure 3A:
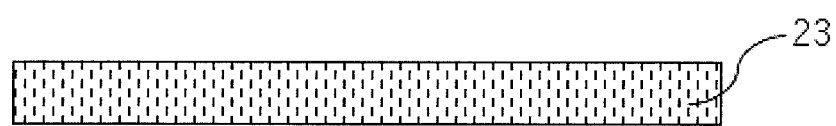
FIG. 3(a) is an arrangement example of a conductive loop of a honeycomb structure according to an embodiment of the present invention.
Figure 3B:
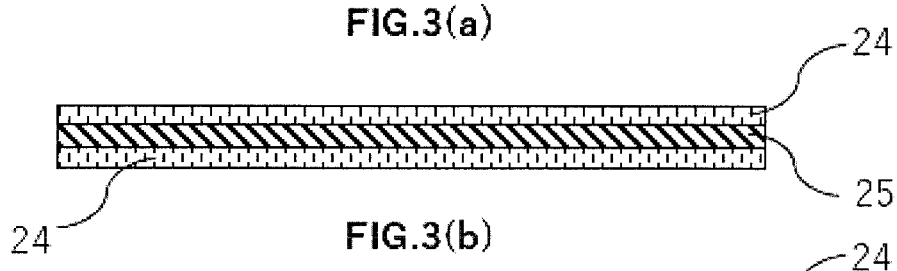
FIG. 3(b) is an arrangement example of a conductive loop of a honeycomb structure according to an embodiment of the present invention.
Figure 3C:
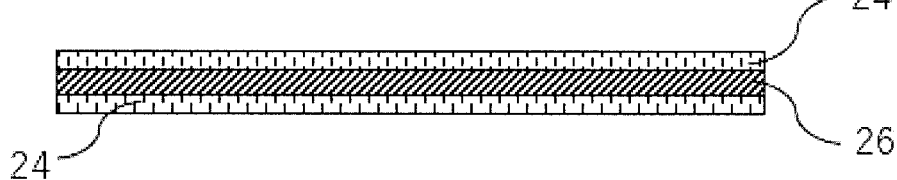
FIG. 3(c) is an arrangement example of a conductive loop of a honeycomb structure according to an embodiment of the present invention.

As shown in FIG. 3(*a*), the conductive loop 21 may be configured to a conductive particle-containing layer 23. As the conductive particle-containing layer 23, a layer formed by containing conductive particles in a joining material can be used. A particle size of the conductive particles can be such that, for example, an average particle size D50 in volume basis is from 10 to 3000 μm. Examples of the joining material of the conductive particle-containing layer 23 that can used includes ceramics, glass, or a composite material of ceramics and glass. Examples of a composite material forming the joining material of the conductive particle-containing layer 23 include a material containing 50% by volume or more, more preferably 60% by volume or more, and still more preferably 70% by volume or more of glass. Examples of the ceramics forming the joining material of the conductive particle-containing layer 23 include ceramics such as $SiO_2$—, $Al_2O_3$—, $SiO_2$—$Al_2O_3$—, $SiO_2$—$ZrO_2$—, and $SiO_2$—$Al_2O_3$—$ZrO_2$-based ceramics. Examples of the glass forming the joining material of the conductive particle-containing layer 23 include glass such as lead-free $B_2O_3$—$Bi_2O_3$—, $B_2O_3$—$ZnO$—$Bi_2O_3$—, $B_2O_3$—$ZnO$—, $V_2O_5$—$P_2O_5$—, $SnO$—$P_2O_5$—, $SnO$—$ZnO$—$P_2O_5$—, $SiO_2$—$B_2O_3$—$Bi_2O_3$—, and $SiO_2$—$Bi_2O_3$—$Na_2O$-based glass.

The conductive loop 21 may be formed of a metal mesh member 25. Further, as shown in FIG. 3(*b*), a joining material 24, the metal mesh member 25, and the joining material 24 may be laminated in this order when the conductive loop 21 is viewed in a plane view. According to such a configuration, the joining material 24 is provided between the metal mesh member 25 and the groove portion 22, so that the metal mesh member 25 embedded in the groove portion 22 can be further satisfactorily joined to the partition walls 12 of the honeycomb structure 1. As the joining material 24, the same material as or a different material from the joining material of the conductive particle-containing layer 23 as described above may be used. The metal mesh member 25 may be configured to metal fibers. Further, the metal fibers may be configured to metal wool.

The conductive loop 21 may be formed of a metal plate member 26. Further, as shown in FIG. 3(*c*), the joining material 24, the metal plate member 26, and the joining material 24 may be laminated in this order when the conductive loop 21 is viewed in a plane view. According to such a configuration, the joining member 24 is provided between the metal plate member 26 and the groove portion 22, so that the metal plate member 26 embedded in the groove portion 22 can be further satisfactorily joined to the partition walls 12 of the honeycomb structure 1.

Further, if the conductive loop 21 is the conductive particle-containing layer 23 containing the joining material, or the conductive loop 21 is the metal mesh member 25 or the metal plate member 26 configured to embed it in the groove portion 22 via the joining material 24, any leakage of a gas from the groove portion 22 can be satisfactorily suppressed by the joining material when the honeycomb structure 1 is used as an exhaust gas filter.

Conductive particles contained in the conductive particle-containing layer 23, the metal mesh member 25, and the metal plate member 26, which form the conductive loop 21, are not particularly limited as long as they are made of a conductive material. For example, ferritic stainless steel, austenitic stainless steel, and other alloys containing at least one element selected from the group consisting of Fe, Co, and Ni can be used.

The form of the conductive loop 21 is not limited to that shown in FIGS. 1 and 2. Hereinafter, various other forms of the conductive loop 21 will be described in detail.

Figure 4A:
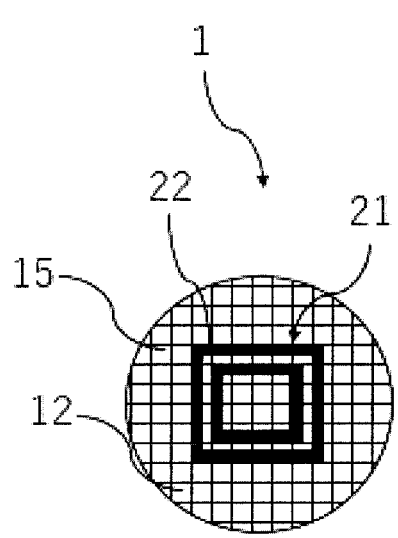
FIG. 4(a) is a plane view schematically showing one end face of a honeycomb structure according to an embodiment of the present invention.
Figure 4B:
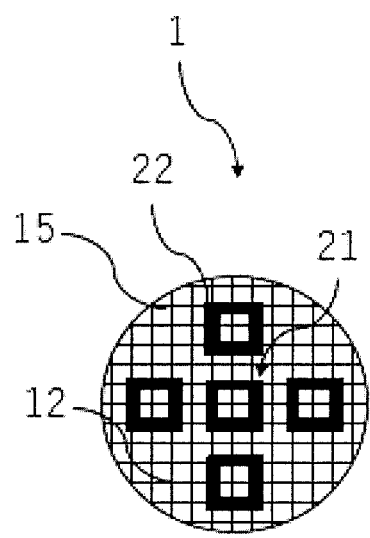
FIG. 4(b) is a plane view schematically showing one end face of a honeycomb structure according to an embodiment of the present invention.

The conductive loop 21 as shown in FIG. 4(*a*) forms a double structure of a larger annular conductive loop having a substantially regular quadrangular shape placed on the outer side and a smaller annular conductive loop having a substantially regular quadrangular shape on the inner side, with each center being the center of the end face 13 when viewed from the end face 13 side of the honeycomb structure 1. The conductive loop 21 may have a triple, quadruple, or quintuple structure, or more.

The conductive loop 21 as shown in FIG. 4(*b*) is comprised of five conductive loops in total: an annular conductive loop having a substantially regular quadrangular shape with its center being the center of the end face 13 when viewed from the end face 13 side of the honeycomb structure 1, and annular conductive loops having the same size and shape, each one loop being arranged on upper, lower, left and right side of the former conductive loop at an equal interval. Any number of conductive loops 21 can be arranged by changing the size, and a total of two, three, four, or six or more loops may be arranged.

Figure 5A:
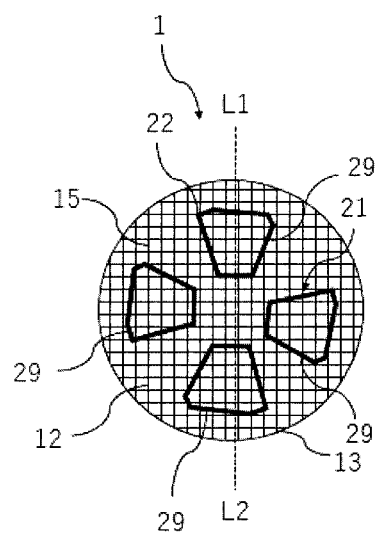
FIG. 5 (a) is a plane view schematically showing one end face of a honeycomb structure according to an embodiment of the present invention.
FIG. 5(b) is a cross-sectional view schematically showing a cross section of cells and partition walls of a honeycomb structure according to an embodiment of the present invention, the cross section being parallel to an extending direction of the cells.
Figure 5B:
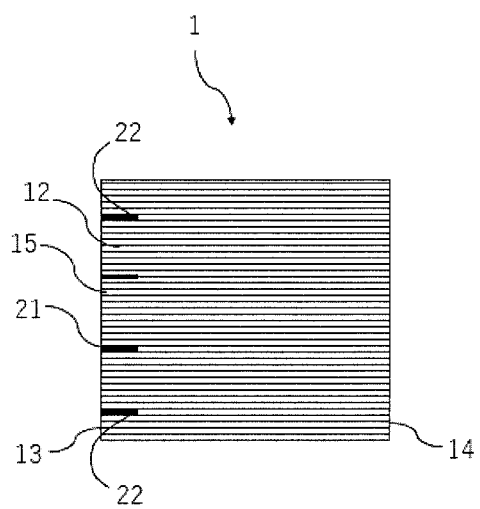

The conductive loop 21 as shown in FIGS. 5(*a*) and 5(*b*) is comprised of four conductive loops provided at positions separated from each other at equal intervals with their centers being the center of the end face 13 when viewed from the end face 13 side of the honeycomb structure 1. Each conductive loop is formed in a hexagonal ring shape, and has a side 29 having a part of the side extending in a linear direction from the center of the end face 13. Any number of conductive loops 21 can be arranged by changing the size, and a total of two, three, or five or more conductive loops 21 may be arranged. If a part of the honeycomb structure 1 has an elevated temperature and soot combustion starts at that position, the heating will propagate in its vicinity due to the soot combustion heat, so that the soot combustion propagates in the radial and axial directions of the honeycomb structure 1. Therefore, in order to burn all the soot, it is not necessary to heat completely the entire honeycomb structure 1 by induction heating, and it is more important to reach the soot combustible temperature rapidly even at one point. However, in order to burn the soot more reliably and at an early stage, it is more desirable to start the soot combustion from a plurality of locations by forming a plurality of conductive loops 21. Further, when the honeycomb structure 1 is formed of a plurality of conductive loops 21, only the conductive loop material and its surroundings are heated when a material having a low thermal conductivity such as cordierite is used as the honeycomb structure 1, so that it is possible to suppress difficulty in increasing the temperature of the honeycomb material at a remote position.

Figure 6A:
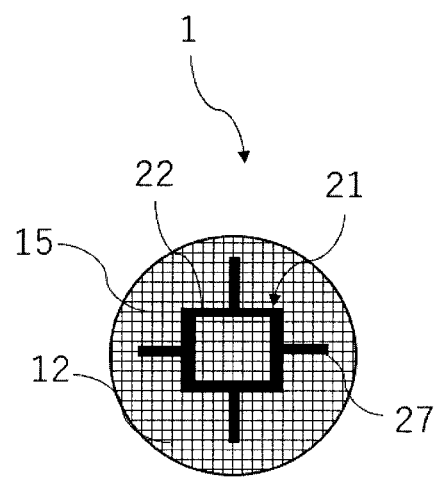
FIG. 6(a) is a plane view schematically showing one end face of a honeycomb structure according to an embodiment of the present invention.
Figure 6B:
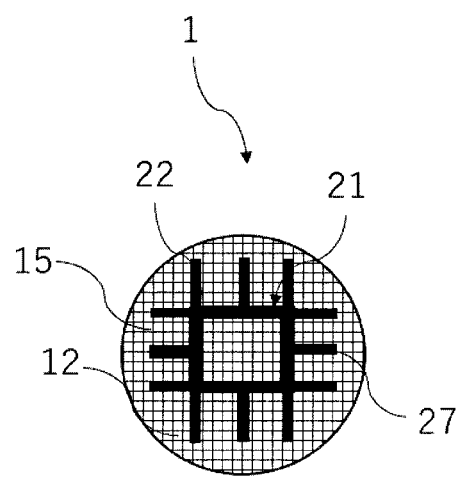
FIG. 6(b) is a plane view schematically showing one end face of a honeycomb structure according to an embodiment of the present invention.
Figure 7A:
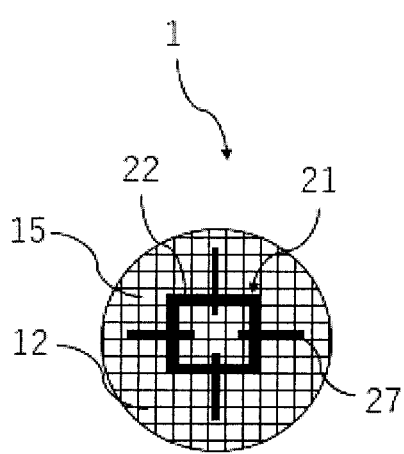
FIG. 7(a) is a plane view schematically showing one end face of a honeycomb structure according to an embodiment of the present invention.
Figure 7B:
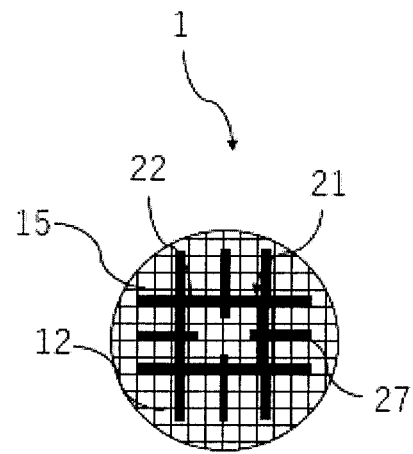
FIG. 7(b) is a plane view schematically showing one end face of a honeycomb structure according to an embodiment of the present invention.

The conductive loop 21 as shown in FIG. 6(*a*) is provided with linear heat conductive fins 27 in directions extending from the centers of the respective sides of the annular conductive loop having a substantially regular quadrangular shape as shown in FIGS. 1 and 2 to the outer peripheral wall 11. The conductive loop 21 as shown in FIG. 6(*b*) is provided with linear heat conductive fins 27 in directions extending from the centers and both ends of the respective sides of the conductive annular loop having a substantially regular quadrangular shape as shown in FIGS. 1 and 2 to the outer peripheral wall 11. The conductive loop 21 as shown in FIG. 7(a) has a shape in which the heat conductive fins 27 of the conductive loop 21 as shown in FIG. 6(a) extend in the central direction of the end face 13. The conductive loop 21 as shown in FIG. 7(b) has a shape in which the heat conductive fins 27 provided at the centers of the respective sides of the conductive loop 21 as shown in FIG. 6(b) extend in the center direction of the end face 13. These heat conductive fins 27 can be formed of the same material as that of the conductive loop 21. According to such configurations, the heat of the central annular conductive loop having a substantially regular quadrangular shape can be dispersed to circumference by the heat conductive fins 27, so that it is possible to prevent only the central annular conductive loop having a substantially regular quadrangular shape from being rapidly heated.

Figure 8A:
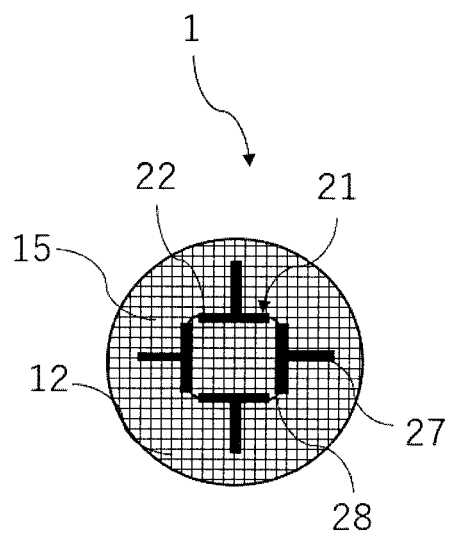
FIG. 8(a) is a plane view schematically showing one end face of a honeycomb structure according to an embodiment of the present invention.
Figure 8B:
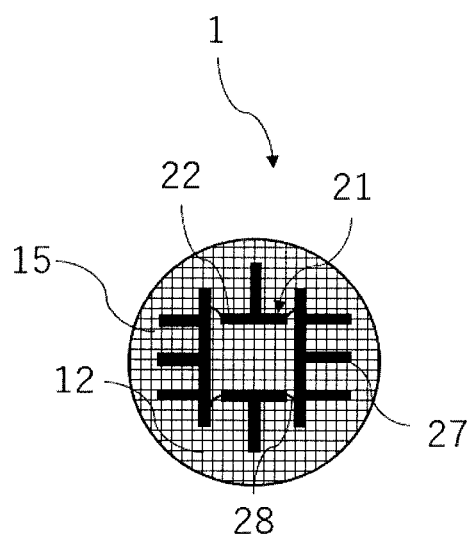
FIG. 8(b) is a plane view schematically showing one end face of a honeycomb structure according to an embodiment of the present invention.

The conductive loop 21 as shown in FIG. 8(a) has four corners of the annular conductive loop having a substantially regular quadrangular shape, which are formed of conductive elastic members 28, in the conductive loop 21 as shown in FIG. 6(a). The conductive loop 21 as shown in FIG. 8(b) has four corners of the annular conductive loop having a substantially regular quadrangular shape, which are formed of conductive elastic members 28, in the conductive loop 21 as shown in FIG. 6(b). According to such configurations, a difference between thermal expansions of the ceramic material and the conductive material of the conductive loop 21 during heating of the honeycomb structure 1 is absorbed, so that any destruction of the honeycomb structure 1 can be satisfactorily suppressed. When the conductive loop 21 is formed in the polygonal annular shape as shown in FIGS. 8(a) and 8(b), the conductive elastic members 28 are preferably provided at corner portions where breakage due to the above thermal expansion difference tends to occur, although not limited to thereto. The conductive elastic members 28 may be provided at any position of the annular conductive loop 21, and the number of the conductive elastic members 28 is not particularly limited. Each conductive elastic member 28 can be composed of a conductive wire, a metal mesh, a thin portion of the conductive loop 21, a spring member, or the like.

Such a honeycomb structure 1 is produced by forming a green body containing a ceramic raw material into a honeycomb shape having partition walls 12 that penetrate from one end face to other end face and define a plurality of cells 15 to form flow paths for a fluid, to form a honeycomb formed body, and drying the honeycomb formed body and then firing it. When such a honeycomb structure is used as the honeycomb structure 1 according to the present embodiment, the outer peripheral wall may be integrally extruded with a honeycomb structure portion, which is used as the outer peripheral wall as it is, or an outer circumference of the honeycomb formed body (honeycomb structure) may be ground and shaped into a predetermined shape after forming or firing it, and a coating material may be applied to the outer circumference-ground honeycomb structure to form an outer peripheral coating. In the honeycomb structure 1 of this embodiment, for example, a honeycomb structure having an outer circumference without grinding the outermost circumference of the honeycomb structure may be used, and the coating material may be further applied onto the outer peripheral surface of the honeycomb structure having the outer circumference (that is, a further outer side of the outer circumference of the honeycomb structure) to form the outer coating. That is, in the former case, only the outer peripheral coating made of the coating material forms the outer peripheral surface positioned on the outermost circumference. On the other hand, in the latter case, an outer peripheral wall having a two-layered structure positioned on the outermost periphery is formed in which the outer peripheral coating made of the coating material is further laminated on the outer peripheral surface of the honeycomb structure. The outer peripheral wall may be extruded integrally with the honeycomb structure portion and fired as it is, which may be used as the outer peripheral wall without processing the outer circumference.

A composition of the coating material is not particularly limited, and various known coating materials can be appropriately used. The coating material may further contain colloidal silica, an organic binder, clay and the like. The organic binder is preferably used in an amount of from 0.05 to 0.5% by mass, and more preferably from 0.1 to 0.2% by mass. Further, the clay is preferably used in an amount of from 0.2 to 2.0% by mass, and more preferably from 0.4 to 0.8% by mass.

The honeycomb structure 1 is not limited to an integral type honeycomb structure 1 in which the partition walls 12 are integrally formed. For example, the honeycomb structure 1 may be a honeycomb structure 1 in which pillar shaped honeycomb segments each having a plurality of cells 15 defined by porous partition walls 12 to form flow paths for a fluid are combined via joining material layers (which, hereinafter, may be referred to as a "joined honeycomb structure").

The honeycomb structure 1 according to the present embodiment may have a catalyst supported on the surfaces of the porous partition walls 12 that form inner walls of the cells 15 and/or in pores of the partition walls 12. Thus, the honeycomb structure 1 according to the present embodiment may be structured as a catalyst support having a supported catalyst.

A type of the catalyst is not particularly limited, and it can be appropriately selected according to the use purposes and applications of the honeycomb structure 1. Examples of the catalyst include noble metal catalysts or other catalysts. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a lean nitrogen oxides trap catalyst (LNT catalyst) containing an alkaline earth metal and platinum as storage components for nitrogen oxides ($NO_x$). Illustrative examples of a catalyst that does not use the noble metal include a $NO_x$ selective catalytic reduction catalyst (SCR catalyst) containing a copper-substituted or iron-substituted zeolite, and the like. Also, two or more catalysts selected from the group consisting of those catalysts may be used. A method for supporting the catalyst is not particularly limited, and it can be carried out according to a conventional method for supporting the catalyst on the honeycomb structure.

Using each of fired honeycomb structures as a honeycomb segment, the side faces of the plurality of honeycomb segments can be joined with a joining material so as to be integrated to provide a honeycomb structure in which the honeycomb segments are joined. For example, the honeycomb structure in which the honeycomb segments are joined can be produced as follows. The joining material is applied to joining surfaces (side surfaces) of each honeycomb segment while attaching joining material adhesion preventing masks to both end faces of each honeycomb segment.

These honeycomb segments are then arranged adjacent to each other such that the side surfaces of the honeycomb segments are opposed to each other, and the adjacent honeycomb segments are pressure-bonded together, and then heated and dried. Thus, the honeycomb structure in which the side surfaces of the adjacent honeycomb segments are joined with the joining material is produced. For the honeycomb structure, the outer peripheral portion may be ground into a desired shape (for example, a pillar shape), and the coating material may be applied to the outer peripheral surface, and then heated and dried to form an outer peripheral wall 11.

The material of the joining material adhesion preventing mask that can be suitably used includes, but not particularly limited to, synthetic resins such as polypropylene (PP), polyethylene terephthalate (PET), polyimide, Teflon (registered trademark) and the like. Further, the mask is preferably provided with an adhesive layer, and the material of the adhesive layer is preferably an acrylic resin, a rubber (for example, a rubber mainly based on a natural rubber or a synthetic rubber), or a silicon resin.

Examples of the joining material adhesion preventing mask that can be suitable used include a pressure sensitive adhesive film having a thickness of from 20 to 50 µm.

The joining material that can be used may be prepared by, for example, mixing ceramic powder, a dispersion medium (for example, water or the like), and optionally additives such as a binder, a deflocculant and a foaming resin. The ceramics may be preferably ceramics containing at least one selected from the group consisting of cordierite, mullite, zircon, aluminum titanate, silicon carbide, silicon nitride, zirconia, spinel, indialite, sapphirine, corundum, and titania, and more preferably having the same material as that of the honeycomb structure. The binder includes polyvinyl alcohol, methyl cellulose, CMC (carboxymethyl cellulose) and the like.

Next, a method for producing the honeycomb structure 1 will be described. First, the honeycomb structure having the porous partition walls and the plurality of cells defined by the partition walls is produced. For example, when producing the honeycomb structure made of cordierite, a cordierite-forming raw material is firstly prepared. The cordierite-forming raw material contains a silica source component, a magnesia source component, and an alumina source component, and the like, in order to formulate each component so as to have a theoretical composition of cordierite. Among them, the silica source component that can be used includes preferably quartz and fused silica, and the particle diameter of the silica source component is preferably from 100 to 150 µm.

Examples of the magnesia source component include talc and magnesite. Among them, talc is preferred. The talc is preferably contained in an amount of from 37 to 43% by mass in the cordierite-forming raw material. The talc preferably has a particle diameter (average particle diameter) of from 5 to 50 µm, and more preferably from 10 to 40 µm. Further, the magnesia (MgO) source component may contain $Fe_2O_3$, CaO, $Na_2O$, $K_2O$ and the like as impurities.

The alumina source component preferably contains at least one of aluminum oxide and aluminum hydroxide, in terms of fewer impurities. Further, aluminum hydroxide is preferably contained in an amount of from 10 to 30% by mass, and aluminum oxide is preferably contained in an amount of from 0 to 20% by mass, in the cordierite-forming raw material.

A material for a green body to be added to the cordierite-forming raw material (additive) is then prepared. At least a binder and a pore former are used as additives. In addition to the binder and the pore former, a dispersant or a surfactant can be used.

The pore former that can be used includes a substance that can be oxidatively removed by reacting with oxygen at a temperature equal to or lower than a firing temperature of cordierite, or a low melting point reactant having a melting point at a temperature equal to or lower than the firing temperature of cordierite, or the like. Examples of the substance that can be oxidatively removed include resins (particularly particulate resins), graphite (particularly particulate graphite) and the like. Examples of the low melting point reactant that can be used include at least one metal selected from the group consisting of iron, copper, zinc, lead, aluminum, and nickel, alloys mainly based on those metals (e.g., carbon steel or cast iron for iron, stainless steel), or alloys mainly based on two or more of those metals. Among them, the low melting point reactant is preferably an iron alloy in the form of powder or fiber. Further, the low melting point reactant preferably has a particle diameter or a fiber diameter (an average diameter) of from 10 to 200 µm. Examples of a shape of the low melting point reactant include a spherical shape, a wound-lozenge shape, a konpeito shape, and the like. These shapes are preferable because the shape of the pores can be easily controlled.

Examples of the binder include hydroxypropylmethyl cellulose, methyl cellulose, hydroxyethyl cellulose, carboxymethyl cellulose, polyvinyl alcohol and the like. Further, examples of the dispersant include dextrin, polyalcohol and the like. Furthermore, examples of the surfactant include fatty acid soaps. The additive may be used alone or in combination of two or more.

Subsequently, to 100 parts by mass of the cordierite-forming raw material are added from 3 to 8 parts by mass of the binder, from 3 to 40 parts by mass of the pore former, from 0.1 to 2 parts by mass of the dispersant, and from 10 to 40 parts by mass of water, and these materials for a green body are kneaded to prepare a green body.

The prepared green body is then formed into a honeycomb shape by an extrusion molding method, an injection molding method, a press molding method, or the like to obtain a raw honeycomb formed body. The extrusion molding method is preferably employed, because continuous molding is easy, and, for example, cordierite crystals can be oriented. The extrusion molding method can be performed using an apparatus such as a vacuum green body kneader, a ram type extrusion molding machine, a twin-screw type continuous extrusion molding machine, or the like.

The honeycomb formed body is then dried and adjusted to a predetermined size to obtain a honeycomb dried body. The honeycomb formed body can be dried by hot air drying, microwave drying, dielectric drying, drying under reduced pressure, vacuum drying, freeze drying and the like. It is preferable to perform combined drying of the hot air drying and the microwave drying or dielectric drying, because the entire honeycomb formed body can be rapidly and uniformly dried.

Figure 9:
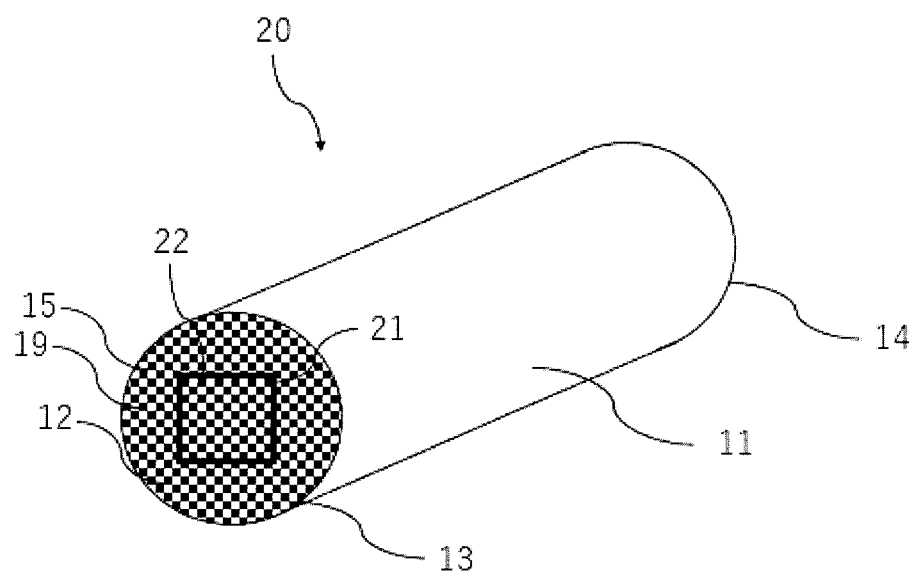
FIG. 9 is a perspective view schematically showing a honeycomb structure having plugged portions according to an embodiment of the present invention.
Figure 10:
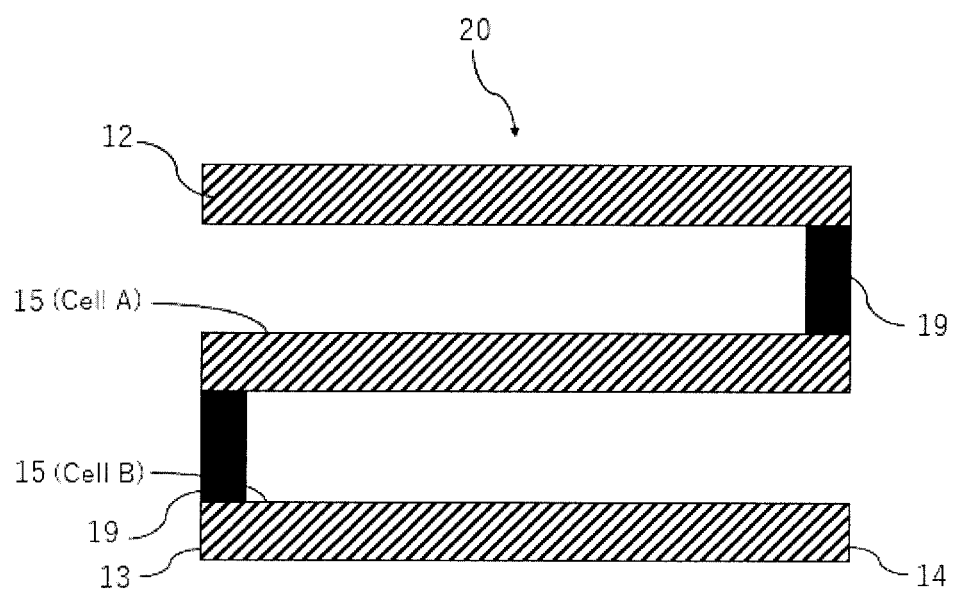
FIG. 10 is a cross-sectional view schematically showing a cross section of cells and partition walls of a honeycomb structure having plugged portions according to an embodiment of the present invention, the cross section being parallel to an extending direction of the cells.

As will be described later, when producing the honeycomb structure 20 having the plugged portions as shown in FIGS. 9, 10 and 11, a raw material for the plugged portions is prepared herein. The material for the plugged portions (plugging slurry) may use the same material for a green body as that of the partition walls (honeycomb dried body), or may use a different material. Specifically, the raw material for the plugged portions can be obtained by mixing a ceramic raw material, a surfactant, and water, and optionally adding a sintering aid, a pore former and the like to form a slurry, which is kneaded using a mixer or the like. Subsequently, masks are applied onto some of cell opening portions on one end face of the honeycomb dried body, and the end face is immersed in a storage container in which the plugging slurry is stored to fill the non-masked cells with the plugging slurry. Similarly, masks are applied onto some of cell opening portions on the other end face of the honeycomb dried body, and the end face is immersed in a storage container in which the plugging slurry is stored to fill the non-masked cells with the plugging slurry. It is then dried to obtain a honeycomb dried body having plugged portions. A method of plugging is simply carried out by pushing a paste-like material into the cells with a spatula such as a squeegee. It is easy to control the depth by the number of squeegee processes pushed. The number of pushing processes is increased for the portions of the cells desired to insert the magnetic material deeply, and the number of pushing processes is decreased for shallow portions around the former cells.

The honeycomb dried body is then fired to obtain a honeycomb structure. As the drying conditions, the same conditions as those for drying the honeycomb formed body can be used. Further, the conditions for the above firing can be typically in an air atmosphere at a temperature of 1410 to 1440° C. for 3 to 15 hours, when the cordierite-forming raw material is used.

A groove portion(s) is/are then formed on one or both of one end face and the other end face in the fired honeycomb structure, and at least one annular conductive loop containing a conductive material is embedded in the groove portion. The groove portion may be formed by ultrasonic processing or may be processed by a grindstone. In either case, first, a covering material (a resin sheet or the like) is attached onto one end face of the honeycomb structure so as to cover the entire end face and sealed. Subsequently, when the groove portion is formed by ultrasonic processing, for example, an ultrasonic drill of an ultrasonic processing machine can be directly applied to the end face of the fired honeycomb structure to ground it, thereby forming the groove portion having a desired shape and depth. When the groove portion is formed by processing with the grindstone, a groove portion having a desired shape and depth is formed on the end face using the grindstone.

For the honeycomb structure having the groove portions thus formed on the end face, a bottom portion of the groove portion is sealed. The sealing can be carried out by using a clay or the like. A material of the clay is not particularly limited, and a general material can be used. It is preferable to use a material obtained by mixing cordierite particles, colloidal silica, starch which is a pore former for forming micropores, and water, and adjusting a viscosity to an appropriate one.

Subsequently, at least one annular conductive loop containing a conductive material is embedded in the groove portion. In this case, when the conductive loop is composed of the conductive particle-containing layer, a slurry of the conductive particles and the joining material is prepared, and the slurry is injected into the groove portion. The honeycomb structure is then dried, the covering material (resin sheet or the like) on the end face is then peeled off, and the honeycomb structure is fired. The firing conditions can be conditions where the material used as the joining material is cured.

When the conductive loop is the metal plate member or the metal mesh member, the metal plate member or the metal mesh member is embedded in the groove portion and the joining material is poured into the groove portion. Subsequently, the honeycomb structure is dried, the covering material (resin sheet or the like) on the end face is then peeled off, and the honeycomb structure is fired. The firing conditions can be conditions where the material used as the joining material is cured.

When the obtained honeycomb structure having the conductive loop embedded in the groove portion is produced in a state where the outer peripheral wall is formed on the outer peripheral surface of the honeycomb structure, the outer peripheral surface may be ground to remove the outer peripheral wall. The coating material is applied to the outer circumference of the honeycomb structure from which the outer peripheral wall has thus been removed, in a subsequent step, to form an outer peripheral coating. Further, when grinding the outer peripheral surface, a part of the outer peripheral wall may be ground and removed, and on that part, the outer peripheral coating may be formed by the coating material.

When preparing the coating material, it can be prepared using, for example, a biaxial rotary type vertical mixer.

Further, the coating material may further contain colloidal silica, an organic binder, clay and the like. The content of the organic binder is preferably from 0.05 to 0.5% by mass, and more preferably from 0.1 to 0.2% by mass. The content of the clay is preferably from 0.2 to 2.0% by mass, and more preferably from 0.4 to 0.8% by mass.

The coating material is applied onto the outer peripheral surface of the honeycomb structure previously produced, and the applied coating material is dried to form an outer peripheral coating. Such a structure can allow for effective suppression of cracking in the outer peripheral coating during the drying and the heat treatment.

Examples of a method for coating the coating material can include a method for applying the coating material by placing the honeycomb structure on a rotating table and rotating it, and pressing a blade-shaped applying nozzle along the outer peripheral portion of the honeycomb structure while discharging the coating material from the applying nozzle. Such a configuration can allow the coating material to be applied with a uniform thickness. Further, this method can lead to a decreased surface roughness of the formed outer peripheral coating, and can result in an outer peripheral coating that has an improved appearance and is difficult to be broken by thermal shock.

When the outer peripheral surface of the honeycomb structure is ground and the outer peripheral wall is removed, the coating material is applied onto the entire outer peripheral surface of the honeycomb structure to form the outer peripheral coating. On the other hand, when the outer peripheral wall is present on the outer peripheral surface of the honeycomb structure or a part of the outer peripheral wall is removed, the coating material may be partially applied to form the outer peripheral coating, or the coating material may be, of course, applied onto the entire outer peripheral surface of the honeycomb structure to form the outer peripheral coating.

The method for drying the applied coating material (i.e., the undried outer peripheral coating) is not limited, but in terms of preventing dry-cracking, it can suitably use, for example, a method of drying 25% or more of a water content in the coating material by maintaining the coating material at room temperature for 24 hours or more, and then maintaining it in an electric furnace at 600° C. for 1 hour or more to remove moisture and organic matters.

Further, when the opening portions of the cells of the honeycomb structure are not plugged in advance, plugging may be performed in the opening portions of the cells after forming the outer peripheral coating.

FIG. 9 shows a perspective view schematically showing a honeycomb structure 20 having plugged portions 19 according to an embodiment of the present invention. FIG. 10 shows a cross-sectional view schematically showing a cross section of cells 15 and partition walls 12 of the honeycomb structure 20 having plugged portions 19 according to an embodiment of the present invention, the cross section being parallel to an extending direction of the cells 15. The honeycomb structure 20 is formed in a pillar shape, and includes: an outer peripheral wall 11; and porous partition walls 12 arranged on an inner side of the outer peripheral wall 11, the porous partition walls 12 defining a plurality of cells 15 penetrating from one end face 13 to other end face 14 to form flow paths for a fluid. In the illustrated honeycomb structure 20, the cells 15 include: a plurality of cells A which are opened on the one end face 13 side and have plugged portions 19 on the other end face 14; and a plurality of cells B which are arranged alternately with the cells A, and which are opened on the other end face 14 side and have plugged portions 19 on the one end face 13. The cells A and the cells B are alternately arranged so as to be adjacent to each other via the partition walls 12, and both end faces form a checkered pattern. The numbers, arrangements, shapes and the like of the cells A and B, as well as the thickness of the partition walls 12, and the like, are not limited, and may be appropriately designed as needed. The honeycomb structure 20 having such a configuration can be used as a filter (for example, a diesel particulate filter; hereinafter, also referred to as "DPF") provided with the plugged portions 19 for burning and removing particulate matters (carbon particulates) in an exhaust gas by using induction heating. In addition, the plugged portions 19 may employ those formed in the same manner as in the plugged portions of the conventionally known honeycomb structure. The plugged portions 19 may be arranged after forming an outer peripheral coating, or may be arranged before forming the outer peripheral coating, i.e., at the stage of production of the honeycomb structure 20.

Figure 11A:
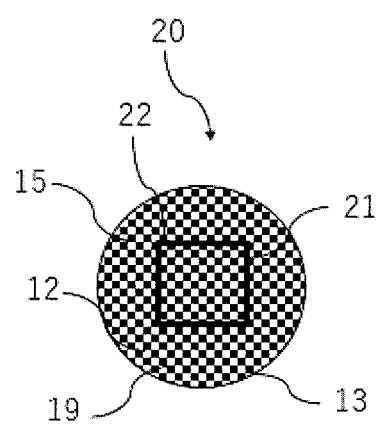
FIG. 11(a) is a plane view schematically showing one end face of a honeycomb structure having plugged portions according to an embodiment of the present invention.
Figure 11B:
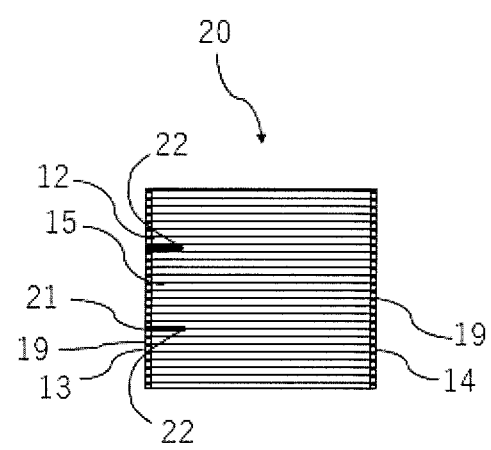
FIG. 11(b) is a cross-sectional view schematically showing a cross section of cells and partition walls of a honeycomb structure having plugged portions according to an embodiment of the present invention, the cross section being parallel to an extending direction of the cells.

FIG. 11(a) illustrates a plane view schematically showing one end face 13 of the honeycomb structure 20. FIG. 11(b) illustrates a cross-sectional view schematically showing a cross section of the cells 15 and the partition walls 12 of the honeycomb structure 20, the cross section being parallel to an extending direction of the cells 15. As with the configuration described for the honeycomb structure 1, the honeycomb structure 20 having the plugged portions 19 is also provided with the groove portion 22 on one or both of one end face 13 and the other end face 14, and has at least one annular conductive loop 21 containing a conductive material embedded in the groove portion 22.

<2. Exhaust Gas Purifying Device>

Figure 12:
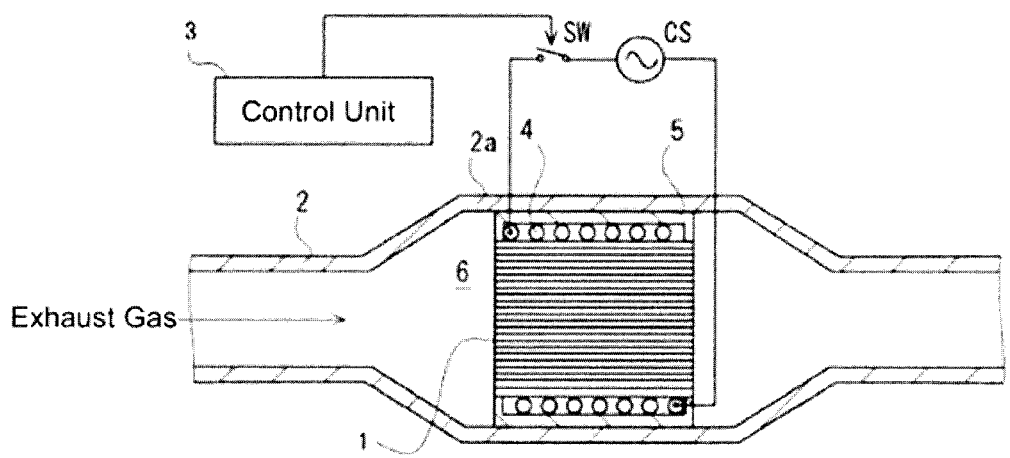
FIG. 12 is a schematic view of an exhaust gas flow path of an exhaust gas purifying device incorporating a honeycomb structure.

Using the honeycomb structure according to the present invention as described above, an exhaust gas purifying device can be formed. As an example, FIG. 12 shows a schematic view of an exhaust gas flow path of an exhaust gas purifying device 6 including the honeycomb structure 1. The exhaust gas purifying device 6 includes the honeycomb structure 1 and a coil wiring 4 that spirally surrounds the outer circumference of the honeycomb structure 1. Also, the exhaust gas purifying device 6 has a metal pipe 2 for housing the honeycomb structure 1 and the coil wiring 4. The exhaust gas purifying device 6 can be arranged in an increased diameter portion 2a of the metal pipe 2. The coil wiring 4 may be fixed to the interior of the metal pipe 2 by a fixing member 5. The fixing member 5 is preferably a heat-resistant member such as ceramic fibers. The honeycomb structure 1 may support a catalyst.

The coil wiring 4 is spirally wound around the outer circumference of the honeycomb structure 1. It is also assumed that two or more coil wirings 4 are used. An AC current supplied from an AC power supply CS flows through the coil wiring 4 in response to turning on (ON) of a switch SW, and as a result, a magnetic field that periodically changes is generated around the coil wiring 4. The on/off of the switch SW is controlled by a control unit 3. The control unit 3 can turn on the switch SW in synchronization with the start of an engine and pass an alternating current through the coil wiring 4. It is also assumed that the control unit 3 turns on the switch SW regardless of the start of the engine (for example, in response to an operation of a heating switch pushed by a driver).

In the present disclosure, a temperature of the honeycomb structure 1 is increased in response to the change of the magnetic field according to the alternating current flowing through the coil wiring 4. Based on this, carbon fine particles and the like collected by the honeycomb structure 1 are burned out. Also, when the honeycomb structure 1 supports the catalyst, the increase in the temperature of the honeycomb structure 1 raises a temperature of the catalyst supported by the catalyst support contained in the honeycomb structure 1 and promotes the catalytic reaction. Briefly, carbon monoxide (CO), nitrogen oxide ($NO_x$), and hydrocarbon (CH) are oxidized or reduced to carbon dioxide ($CO_2$), nitrogen ($N_2$), and water ($H_2O$).

EXAMPLES

Hereinafter, the present invention will be specifically described based on Examples. However, the present invention is not limited to Examples.

Example 1

A cylindrical honeycomb structure made of cordierite ($2MgO \cdot 2Al_2O_3 \cdot 5SiO_2$) was prepared. The cylindrical honeycomb structure had a length of 85 mm, a diameter of a cross section perpendicular to the length direction of 83 mm, a partition wall thickness of 150 µm, a cell density of 63 cells/cm², a porosity of 27%, and an average pore diameter of 2 µm.

Subsequently, a covering material (a resin sheet) was attached to one end face of the honeycomb structure so as to cover the entire end face and sealed. An annular groove portion having the shape as shown in FIG. 8(a) was then formed on the end face using a grindstone having a grinding width of 1.5 mm. The annular groove had an inner diameter of 50 mm, a depth of 1 mm, and a width of 1.5 mm. Further, each portion located in the heat conductive fins of the groove portion had a length of 30 mm and a depth of 1.0 mm.

The bottom portion of the groove portion was sealed with a clay. Used as the clay material was a mixture obtained by mixing cordierite particles, colloidal silica, starch as a pore former for forming micropores, and water and adjusting a viscosity to an appropriate one.

Next, an annular ferritic stainless metal ring having a substantially quadrangular shape with a thickness of 1 mm and a total length of 30 mm, which was provided with a spring member having a low spring constant that facilitated deformation at the corner portion, was inserted into the groove portion having the bottom portion sealed with the clay. A mixed slurry of cordierite particles, colloidal silica, starch as a pore former forming micropores, and water was then injected into a gap in the groove portion and the groove portion into which the annular ferritic stainless metal ring was not inserted.

The honeycomb structure was then dried at 120° C. for 1 hour. The covering material (resin sheet) on the end face was then peeled off, and the honeycomb structure was fired at 700° C. for 1 hour.

As a result, a structure was obtained in which the annular ferric stainless metal ring was embedded and fixed in the groove, and a gas did not enter the groove.

Example 2

A cylindrical honeycomb structure having the same structure as that of Example 1 was prepared.

Subsequently, a covering material (resin sheet) was attached to one end face of the cylindrical honeycomb structure so as to cover the entire end face and sealed. A groove portion having the same size was formed in the same manner as that of Example 1. The groove portion had the shape as shown in FIG. 6(a).

The bottom portion of the groove portion was sealed with the clay in the same manner as that of Example 1.

A slurry containing ferritic stainless steel particles (an average particle diameter of 100 μm), silica-based glass particles (an average diameter of 2 μm), a dispersant, and water was injected into the groove portion. The slurry had a mass ratio of ferritic stainless steel particles:silica-based glass particles:dispersant:water=66:33:1:140.

Next, the injection of the slurry was stopped at the timing when the slurry flowed out from the pores of the covering material on a side opposite to the side where the slurry was injected.

The honeycomb structure was then dried at 120° C. for 1 hour. The covering material (resin sheet) on the end face was then peeled off, and the honeycomb structure was fired at 900° C. for 1 hour.

As a result, a structure was obtained in which the metal ring comprised of the annular ferric stainless steel particles-containing layer was embedded and fixed in the groove, and a gas did not enter the groove.

Example 3

A cylindrical honeycomb structure having the same configuration as that of Example 1 was prepared.

Subsequently, a covering material (resin sheet) was attached to one end face of the cylindrical honeycomb structure so as to cover the entire end face and sealed. A groove portion having the same size was formed in the same manner as that of Example 1. The groove portion had the shape as shown in FIG. 6(a).

The bottom portion of the groove portion was sealed with the clay in the same manner as that of Example 1.

A conductive ring made of an annular ferritic stainless metal fiber cloth having a thickness of 1 mm and a total length of 30 mm, which had a substantially quadrangular shape, was inserted into the groove portion having the bottom portion sealed with the clay. A mixed slurry of cordierite particles, colloidal silica, and starch as a pore former forming micropores, and water was injected into gaps in the groove portion and the groove portion into which the annular ferritic stainless metal fiber cloth was not inserted.

The honeycomb structure was then dried at 120° C. for 1 hour. The covering material (resin sheet) on the end face was then peeled off, and the honeycomb structure was fired at 700° C. for 1 hour.

As a result, a structure was obtained in which the annular ferritic stainless metal fiber cloth was embedded and fixed in the groove, and a gas did not enter the groove.

Comparative Examples 1 and 2

Cylindrical honeycomb structures each having the same structure as that of Example 1 were prepared.

Subsequently, in Comparative Example 1, ferrite stainless steel wires were inserted into the cells at intervals of five cells of the honeycomb structure. In Comparative Example 2, austenitic stainless steel wires were inserted into the cells at intervals of five cells of the honeycomb structure.

(Evaluation Test: Reached Temperature of Maximum Temperature Point)

Each of the obtained honeycomb structures of Example 3 and Comparative Examples 1 and 2 was placed inside the coil, the initial temperature was set to room temperature, and an electric power of 14 kW was applied to the coil at a frequency of 30 kHz to reach the maximum temperature point of each sample, and the reached temperature was measured with a radiation thermometer. Table 1 shows the resulting reached temperatures of the maximum temperature points.

TABLE 1

| Sample | Reached Temperature of Maximum Temperature Point |
| --- | --- |
| Example 3 | 700° C. |
| Comparative Example 1 | 500° C. |
| Comparative Example 2 | Room Temperature |

DISCUSSION

As shown in Table 1, in each of Comparative Examples 1 and 2, the temperature that reached the maximum temperature point did not reach 600° C., which was required for soot combustion. However, in Example 3, the temperature more than 600° C. which was required for the start of the soot combustion was confirmed even at a frequency of 30 kHz.

DESCRIPTION OF REFERENCE NUMERALS 1, 20 honeycomb structure
2 metal tube
3 control unit
4 coil wiring
5 fixing member
6 exhaust gas purifying device
11 outer peripheral wall
12 partition wall
13, 14 end face
15 cells (cell A+cell B)
19 plugged portion
21 conductive loop
22 groove portion
23 conductive particle-containing layer
24 joining material
25 metal mesh member
26 metal plate member
27 heat conductive fin
28 elastic member
29 one side of conductive loop

The invention claimed is:

1. A pillar shaped honeycomb structure, comprising:
an outer peripheral wall; and
porous partition walls disposed inside the outer peripheral wall, the partition walls defining a plurality of cells, each cell of the plurality of cells penetrating from one end face to an other end face to from a flow path,
wherein one or both of the one end face and the other end face comprise a groove portion,
wherein at least one annular conductive loop comprising a conductive material is embedded in the groove portion,
wherein the conductive loop is a conductive particle-containing layer,
wherein the conductive particle-containing layer comprises a joining material,
wherein at least a part of the conductive loop comprises a conductive elastic member, the conductive elastic member is a conductive wire, a metal mesh, a thin portion of the conductive loop, or a spring member, and
wherein the conductive loop has a thickness of from 0.5 to 5 mm.

2. The honeycomb structure according to claim 1, wherein the conductive loop is embedded in the groove portion via the joining material.

3. The honeycomb structure according to claim 1, wherein the conductive loop is provided with heat conductive fins.

4. The honeycomb structure according to claim 1, wherein the groove portion is formed over the plurality of cells.

5. The honeycomb structure according to claim 1, wherein the plurality of cells comprise: a plurality of cells A which are opened on the one end face side and have plugged portions on the other end face; and a plurality of cells B which are arranged alternately with the plurality of cells A, and which are opened on the other end face side and have plugged portions on the one end face.

6. The honeycomb structure according to claim 1, wherein the partition walls and the outer peripheral wall are made of a ceramic material.

7. The honeycomb structure according to claim 6, wherein the ceramic material is at least one selected from the group consisting of cordierite, silicon carbide, aluminum titanate, silicon nitride, mullite, and alumina.

8. The honeycomb structure according to claim 1, wherein the honeycomb structure has a cell density of 5 to 93 cells/cm$^2$.

9. An exhaust gas purifying device, comprising:
the honeycomb structure according to claim 1;
a coil wiring that spirally surrounds an outer circumference of the honeycomb structure; and
a metal pipe for housing the honeycomb structure and the coil wiring.

10. A method for producing the pillar shaped honeycomb structure according to claim 1
wherein the method comprises the steps of:
forming the groove portion on one or both of the one end face and the other end face; and
embedding the at least one annular conductive loop comprising the conductive material in the groove portion.

11. The method for producing the pillar shaped honeycomb structure according to claim 10, wherein the groove portion is formed by ultrasonic processing.

* * * * *